(12) United States Patent
Park

(10) Patent No.: US 11,209,073 B2
(45) Date of Patent: Dec. 28, 2021

(54) HYBRID POWERTRAIN FOR VEHICLE

(71) Applicants: Hyundai Motor Company, Seoul (KR); Kia Motors Corporation, Seoul (KR)

(72) Inventor: Jong Yun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/994,000

(22) Filed: Aug. 14, 2020

(65) Prior Publication Data

US 2021/0293310 A1    Sep. 23, 2021

(30) Foreign Application Priority Data

Mar. 17, 2020 (KR) ........................ 10-2020-0032640

(51) Int. Cl.
*F16H 3/08* (2006.01)
*F16H 3/72* (2006.01)
(Continued)

(52) U.S. Cl.
CPC .............. *F16H 3/72* (2013.01); *B60K 6/365* (2013.01); *B60K 6/387* (2013.01); *B60K 6/547* (2013.01); *F16H 3/78* (2013.01); *F16H 2200/0052* (2013.01); *F16H 2200/2035* (2013.01); *F16H 2200/2094* (2013.01)

(58) Field of Classification Search
CPC ...... F16H 37/02–2037/108; F16H 2200/0052; F16H 2200/2035; F16H 2200/2094; F16H 2200/2041; B60K 6/387; B60K 6/547; B60K 6/48; B60K 2006/4808; B60K 2006/4816

See application file for complete search history.

(56) References Cited

U.S. PATENT DOCUMENTS

2002/0033059 A1* 3/2002 Pels ........................ F16H 63/22
74/329
2004/0149080 A1* 8/2004 Pollak ..................... F16H 3/006
74/661

(Continued)

FOREIGN PATENT DOCUMENTS

KR    10-1573635 B1    11/2015

*Primary Examiner* — Charles A Fox
*Assistant Examiner* — Farhana Pervin
(74) *Attorney, Agent, or Firm* — Morgan, Lewis & Bockius LLP

(57) ABSTRACT

A hybrid powertrain for a vehicle may include a first input shaft selectively connectable to an engine through a first clutch; a second input shaft selectively connectable to the engine through a second clutch and mounted to be coaxial with the first input shaft; a motor input shaft mounted to be coaxial with the first input shaft and to which a motor is connected; a first output shaft and a second output shaft each mounted in parallel to the first input shaft and the second input shaft; a center synchronizing unit mounted between the first input shaft and the motor input shaft and configured to interrupt a connection between the first input shaft and the motor input shaft; a plurality of pairs of circumscription gears configured to form a series of shift ratios used for driving of the vehicle; and a variable transmission mechanism.

13 Claims, 9 Drawing Sheets

(51) Int. Cl.
  *F16H 3/78* (2006.01)
  *B60K 6/365* (2007.10)
  *B60K 6/387* (2007.10)
  *B60K 6/547* (2007.10)

(56) References Cited

U.S. PATENT DOCUMENTS

| | | | |
|---|---|---|---|
| 2015/0226324 A1* | 8/2015 | Gluckler | F16H 3/006 74/664 |
| 2015/0321545 A1* | 11/2015 | Park | F16H 3/46 475/5 |
| 2016/0046185 A1* | 2/2016 | Morscheck | B60K 17/348 701/65 |
| 2016/0102742 A1* | 4/2016 | Lee | B60K 6/48 475/5 |
| 2016/0167503 A1* | 6/2016 | Lee | B60K 6/48 475/5 |
| 2017/0096137 A1* | 4/2017 | Toyama | B60K 6/547 |

\* cited by examiner

FIG. 9

|  | Case1<br>(Not contact) | Case2<br>(Forward contact) | Case3<br>(Reverse contact) |
|---|---|---|---|
| Conventional | $\omega=0$   $\omega=2$rpm | $\omega=0$   $\omega=2$rpm | $\omega=0$   $\omega=2$rpm |
|  | Immediately engaged | Engaged by difference of gear ratios (Within 0.2 seconds) | Not engaged → Release frictional clutch |
| Present disclosure | $\omega=0$   $\omega=2$rpm | $\omega=0$   $\omega=2$rpm | |
|  | Immediately engaged | Engaged by difference of gear ratios (Within 0.2 seconds) | |

HYBRID POWERTRAIN FOR VEHICLE

CROSS-REFERENCE TO THE RELATED APPLICATION

The present application claims priority to Korean Patent Application No. 10-2020-0032640, filed on Mar. 17, 2020, the entire contents of which is incorporated herein for all purposes by this reference.

BACKGROUND OF THE INVENTION

Field of the Invention

The present invention relates to a technology for a layout of a hybrid powertrain, which may be applied to a vehicle.

Description of Related Art

A hybrid powertrain of a transmission mounted electric device (TMED) refers to a powertrain in which a motor is mounted not on an engine but on a transmission.

Conventionally, among the above-described TMED hybrid powertrains, TMED hybrid powertrains in which an engine and a motor are connected by use of an engine clutch have been widely used, but costs accompanied by provision of an engine clutch are required for the powertrains, the speeds of the engine and the motor are required to be the same when the engine clutch is coupled, a main operation area is concentrated on a low-speed area whereby the performance of the motor cannot be sufficiently achieved because a gear-shift map is set according to an optimum operation point of the engine, and a power transmission path from the driving wheels to the motor becomes complex during regenerative braking because the motor is located close to an input side of the transmission, thus deteriorating the regenerative braking efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid powertrain for a vehicle, by which the manufacturing costs and the weight of a hybrid powertrain for a vehicle may be reduced by excluding an engine clutch for interrupting a connection of an engine and a motor, the optimum operation of the motor as well as the engine may be made to be possible by controlling the motor independently from the engine, and a power transmission path between the motor and driving wheels may be made to be shorter during regenerative braking, whereby the efficiency of the hybrid powertrain may be improved during an EV mode and the regenerative braking.

In accordance with an aspect of the present invention, a hybrid powertrain for a vehicle may include: a first input shaft selectively connectable to an engine through a first clutch; a second input shaft selectively connectable to the engine through a second clutch and mounted to be coaxial with the first input shaft; a motor input shaft mounted to be coaxial with the first input shaft and to which a motor is connected; a first output shaft and a second output shaft each mounted in parallel to the first input shaft and the second input shaft; a center synchronizing unit mounted between the first input shaft and the motor input shaft and configured to interrupt a connection between the first input shaft and the motor input shaft; a plurality of pairs of circumscription gears mounted between the motor input shaft and the first output shaft, between the first input shaft and the first output shaft, between the first input shaft and the second output shaft, between the second input shaft and the first output shaft, and between the second input shaft and the second output shaft, and configured to form a series of shift ratios used for driving of the vehicle; and a variable power transmission mechanism configured to continuously vary power of the motor input shaft by use of the center synchronizing unit and transmit a varied power to the first output shaft.

The variable transmission mechanism may include: a variable driving gear rotatably mounted in the motor input shaft; a variable driven gear connected fixedly to the first output shaft to be enmeshed with the variable driving gear; and a servo clutch configured to continuously vary a frictional force between the motor input shaft and the variable driving gear through an operation of the center synchronizing unit.

The servo clutch may be of a conical frictional clutch type, and a conical surface of the servo clutch may be integrally formed with the variable driving gear.

The center synchronizing unit may include: a center hub mounted in the motor input shaft; and a center sleeve configured to be slid on the center hub along an axial direction thereof; and a synchronizer which is connected to the first input shaft through synchronization by a synchronizer ring as the center sleeve moves to one axial side thereof may be provided, and the center sleeve may press the conical surface of the variable driving gear as the center sleeve moves to a second direction.

The pair of circumscription gears between the motor input shaft and the first output shaft may be for a first gear shifting ratio and for a second gear shifting ratio, respectively, the pair of the circumscription gears between the first input shaft and the first output shaft may be for a fourth gear shifting ratio, the pair of the circumscription gears between the first input shaft and the second output shaft may be for a sixth gear shifting ratio, the pair of the circumscription gears between the second input shaft and the first output shaft may be for a fifth gear shifting ratio, and the pair of the circumscription gears between the second input shaft and the second output shaft may be for a third gear shifting ratio.

A first driving gear for the first gear shifting ratio and a second driving gear for the second gear shifting ratio may be mounted in the motor input shaft, a first driven gear enmeshed with the first driving gear and a second driven gear enmeshed with the second driving gear may be mounted in the first output shaft, a third driving gear commonly used for the fourth gear shifting ratio and the sixth gear shifting ratio may be mounted in the first input shaft, a fourth driving gear commonly used for the third gear shifting ratio and the fifth gear shifting ratio may be mounted in the second input shaft, a fourth driven gear enmeshed with the third driving gear and a fifth driven gear enmeshed with the fourth driving gear may be mounted in the first output shaft, and a sixth driven gear enmeshed with the third driving gear and a third driven gear enmeshed with the fourth driving gear may be mounted in the second output shaft.

The first driving gear and the second driving gear may be mounted in the motor input shaft such that rotation thereof is constrained, the third driving gear may be mounted in the first input shaft such that rotation thereof is constrained, the fourth driving gear is mounted in the second input shaft such that rotation thereof may be constrained, first and second synchronizer configured to selectively constrain rotations of the first driven gear and the second driven gear and fourth and fifth synchronizer configured to selectively constrain rotations of the fourth driven gear and the fifth driven gear may be provided in the first output shaft, and third and sixth synchronizer configured to selectively constrain rotations of the third driven gear and the sixth driven gear may be provided in the second output shaft.

A synchronizer configured to perform synchronization by use of the synchronizer ring may be provided between the first and second synchronizer and the first driven gear, and a dog clutch in which sleeves of the first and second synchronizer are directly enmeshed with a clutch gear of the second driven gear may be provided between the first and second synchronizer and the second driven gear.

Facing surfaces of the sleeve of the first and second synchronizer and the clutch gear of the second driven gear, which are enmeshed with each other, may have planar shapes that are perpendicular to the axial directions thereof.

The gear ratio of the variable driving gear and the variable driven gear may be smaller than the gear ratio of the first driving gear and the first driven gear and the gear ratio of the second driving gear and the second driven gear.

A clutch gear enmeshed with the center sleeve of the center synchronizing unit may be integrally formed with the third driving gear.

The first clutch and the second clutch may correspond to a dual clutch formed in one clutch housing, and the second input shaft may be a hollow shaft that surrounds the first input shaft.

According to an exemplary embodiment of the present invention, the manufacturing costs and the weight of a hybrid powertrain for a vehicle may be reduced by excluding an engine clutch for interrupting a connection of an engine and a motor, the optimum operation of the motor as well as the engine may be made to be possible by controlling the motor independently from the engine, and a power transmission path between the motor and driving wheels may be made to be shorter during regenerative braking, whereby the efficiency of the hybrid powertrain may be improved during an EV mode and the regenerative braking.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9 is a table for comparing operations of the first and second synchronizer of FIG. 8 with the related art.

Figure 1:
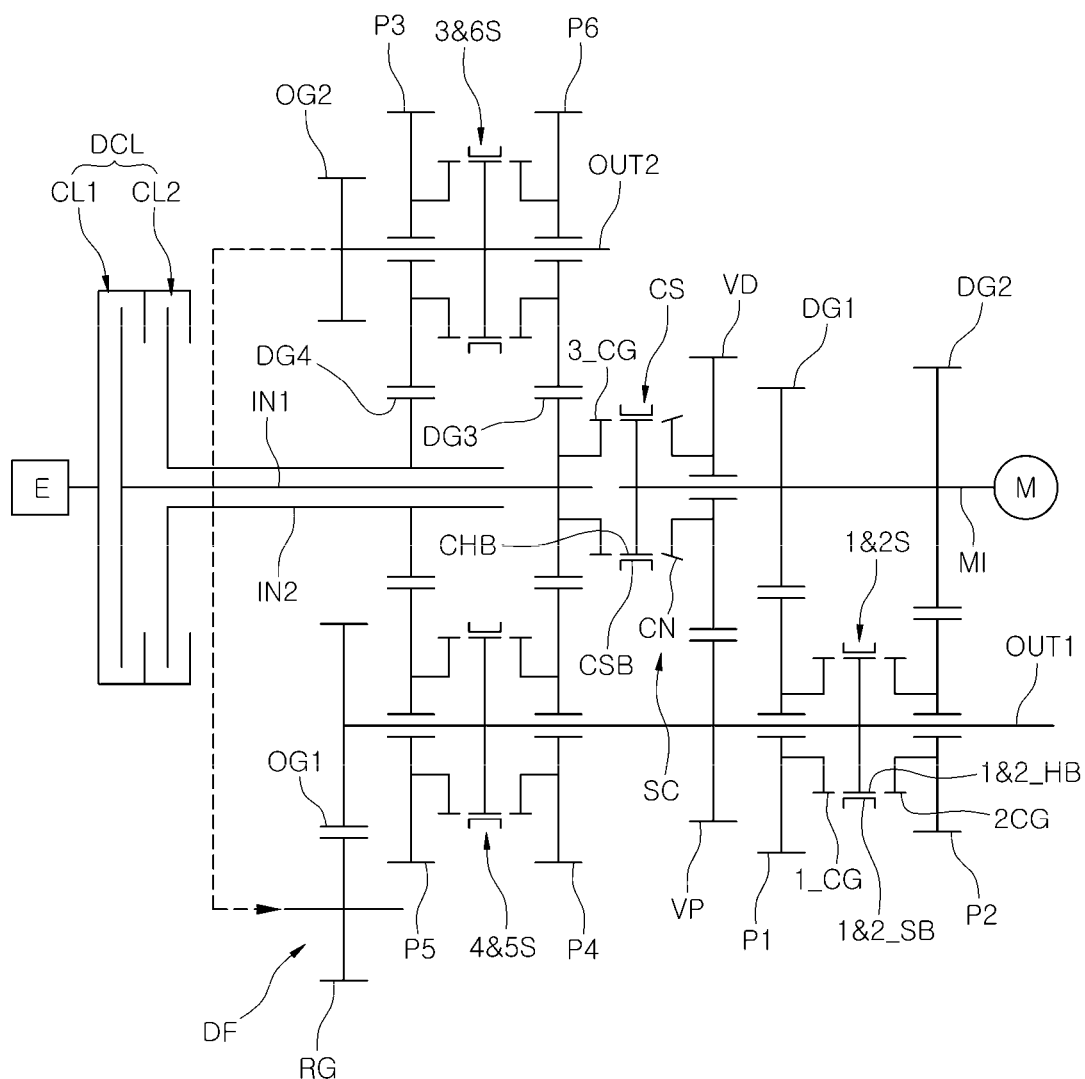
FIG. 1 is a view exemplarily illustrating a configuration of a hybrid powertrain for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, an exemplary embodiment of a hybrid powertrain for a vehicle according to an exemplary embodiment of the present invention includes: a first input shaft IN1 connected to an engine E through a first clutch CL1; a second input shaft IN2 connected to the engine E through a second clutch CL2 and mounted to be coaxial with the first input shaft IN1; a motor input shaft MI mounted to be coaxial with the first input shaft IN1 and to which a motor M is connected; a first output shaft OUT1 and a second output shaft OUT2 mounted in parallel to the first input shaft IN1 and the second input shaft IN2; a center synchronizing unit CS configured to interrupt a connection of the first input shaft IN1 and the motor input shaft MI; a plurality of pairs of circumscription gears mounted between the motor input shaft MI and the first output shaft OUT1, between the first input shaft IN1 and the first output shaft OUT1, between the first input shaft IN1 and the second output shaft OUT2, between the second input shaft IN2 and the first output shaft OUT1, and between the second input shaft IN2 and the second output shaft OUT2, and configured to form a series of shift ratios used for driving of the vehicle; and a variable transmission mechanism configured to continuously vary power of the motor input shaft MI by use of the center synchronizing unit CS and transmit a varied power to the first output shaft OUT1.

That is, in the exemplary embodiment of the present invention, the vehicle is configured to realize a series of shift ratios of first to sixth gears with the plurality of pairs of circumscription gears by the power transmitted from the engine E or the motor M.

The first clutch CL1 and the second clutch CL2 includes a dual clutch DCL formed in one clutch housing, the second input shaft IN2 is a hollow shaft that surrounds the first input shaft IN1, the first output shaft OUT1 is provided with a first output gear OG1, the second output shaft OUT2 is provided with a second output gear OG2, and the first output gear OG1 and the second output gear OG2 are commonly enmeshed with a ring gear RG of a differential DF.

That is, according to the powertrain of the present invention, the third to sixth gears may be realized as the first input shaft IN1 and the second input shaft IN2 transmit the power of the engine E received through the first clutch CL1 and the second clutch CL2 of the dual clutch DCL to the first output shaft OUT1 and the second output shaft OUT2, the first and second gears may be realized as the first input shaft IN1 is connected to the motor input shaft MI and the power of the engine transmitted to the motor input shaft MI is transmitted to the first output shaft OUT1, the power of the gears realized as described above may be extracted through the differential DF, and a smooth gear-shift may be made without any torque interruption though gear-shifts, which will be described below, during the gear-shift operations.

Furthermore, the manufacturing costs and the weight of the vehicle may be reduced because the motor M is not mounted in the engine E through an engine clutch and thus an engine clutch is not mounted, the degree of freedom of control of the motor M can become higher because the motor may be controlled separately and independently from the engine, and power transmission efficiency can become higher because power may be transmitted between the motor M and driving wheels through a relatively short power transmission path in an EV mode or during regenerative braking.

The variable transmission mechanism includes a variable driving gear VD mounted in the motor input shaft MI to be rotatable; a variable driven gear VP mounted in the first output shaft OUT1 to be enmeshed with the variable driving gear VD, and a servo clutch SC configured to continuously vary a frictional force between the motor input shaft MI and the variable driving gear VD through an operation of the center synchronizing unit CS.

The servo clutch SC is of a conical frictional clutch type, and a conical surface CN of the servo clutch SC is integrally formed with the variable driving gear VD.

Of course, not the conical frictional clutch but various frictional clutches such as a general planar disk type frictional clutch may be used as the servo clutch SC.

The center synchronizing unit includes a center hub CHB mounted in the motor input shaft MI, and a center sleeve CSB configured to be slid on the center hub CHB along an axial direction thereof, and a synchronizer which is connected to the first input shaft IN1 through synchronization by a synchronizer as the center sleeve CSB moves to one axial side thereof is provided, and the center sleeve CSB presses the conical surface CN of the variable driving gear VD as the center sleeve CSB moves to an opposite axial side thereof.

Here, the "axial direction" refers to a longitudinal direction of the motor input shaft MI.

Referring to FIG. 1, as illustrated on the left side of the center synchronizing unit CS, the third driving gear DG3 is mounted while rotation thereof is constrained by the first input shaft IN1, and a clutch gear 3_CG which may be enmeshed with the center sleeve CSB of the center synchronizing unit CS is integrally provided in the third driving gear DG3.

The synchronizer ring is provided between the clutch gear 3_CG of the third driving gear DG3 and the center sleeve CSB, and the center sleeve CSB is enmeshed with the clutch gear 3_CG of the third driving gear DG3 by the synchronization of the synchromesh type synchronizer.

For reference, a synchronizer ring which is of the same type as a conventional general synchromesh type synchronizer may be used, and the illustration thereof is omitted in FIG. 1.

Meanwhile, the servo clutch SC is provided on the right side of the center synchronizing unit CS, the center sleeve CSB of the center synchronizing unit CS may be configured to attach a conical frictional ring to the conical surface CN of the variable driving gear VD, and another conical surface may be formed on the left internal side of the center sleeve CSB such that the conical surface of the center sleeve CSB may be directly attached to the conical surface CN of the variable driving gear VD.

Furthermore, the capacity of the actuator that drives the center sleeve CSB may be reduced and a frictional force of the servo clutch SC may be sufficiently secured by providing an operation force increasing mechanism that attaches the frictional ring to the conical surface CN of the variable driving gear VD by increasing an axial operation force of the center sleeve CSB between the center sleeve CSB and the frictional ring.

The pair of circumscription gears between the motor input shaft MI and the first output shaft OUT1 are for a first gear shifting ratio and for a second gear shifting ratio, respectively, the pair of the circumscription gears between the first input shaft IN1 and the first output shaft OUT1 is for a fourth gear shifting ratio, the pair of the circumscription gears between the first input shaft IN1 and the second output shaft OUT2 is for a sixth gear shifting ratio, wherein the pair of the circumscription gears between the second input shaft IN2 and the first output shaft OUT1 is for a fifth gear shifting ratio, and the pair of the circumscription gears between the second input shaft IN2 and the second output shaft OUT2 is for a third gear shifting ratio.

That is, a first driving gear DG1 for the first gear shifting ratio and a second driving gear DG2 for the second gear shifting ratio are mounted in the motor input shaft MI, a first driven gear P1 enmeshed with the first driving gear DG1 and a second driven gear P2 enmeshed with the second driving gear DG2 are mounted in the first output shaft OUT1, a third driving gear DG3 commonly used for the fourth gear shifting ratio and the sixth gear shifting ratio is mounted in the first input shaft IN1, a fourth driving gear DG4 commonly used for the third gear shifting ratio and the fifth gear shifting ratio is mounted in the second input shaft IN2, a fourth driven gear DG4 enmeshed with the third driving gear DG3 and a fifth driven gear P5 enmeshed with the fourth driving gear DG4 are mounted in the first output shaft OUT1, and a sixth driven gear P6 enmeshed with the third driving gear DG3 and a third driven gear P3 enmeshed with the fourth driving gear DG4 are mounted in the second output shaft OUT2.

The first driving gear DG1 and the second driving gear DG2 are mounted in the motor input shaft MI such that rotation thereof is constrained, the third driving gear DG3 is mounted in the first input shaft IN1 such that rotation thereof is constrained, the fourth driving gear DG4 is mounted in the second input shaft IN2 such that rotation thereof is constrained, first and second synchronizer 1&2S configured to selectively constrain rotations of the first driven gear P1 and the second driven gear P2 and fourth and fifth synchronizer 4&5S configured to selectively constrain rotations of the fourth driven gear P4 and the fifth driven gear P5 are provided in the first output shaft, and third and sixth synchronizer 3&6S configured to selectively constrain rotations of the third driven gear P3 and the sixth driven gear P6 are provided in the second output shaft OUT2.

Here, the third and sixth synchronizer 3&6S and the fourth and fifth synchronizer 4&5S are provided with a synchronizer ring on opposite sides of the hub, respectively, and thus when the sleeve is enmeshed with the gears located on the opposite sides of the hub, they may be smoothly enmeshed with each other through synchronization when the gears by the sleeve.

A synchronizer configured to perform synchronization by use of a synchronizer ring is provided between the first and second synchronizer 1&2S and the first driven gear P1, and a dog clutch in which a sleeve 1&2SB of the first and second synchronizer 1&2S is directly enmeshed with a clutch gear of the second driven gear is provided between the first and second synchronizer 1&2S and the second driven gear P2.

That is, the first and second synchronizer 1&2S are provided a synchronizer on a side which is close to the first driven gear P1, but a dog clutch, from which a synchronizer ring is excluded, is provided on a side which is close to the second driven gear P2.

Figure 8:
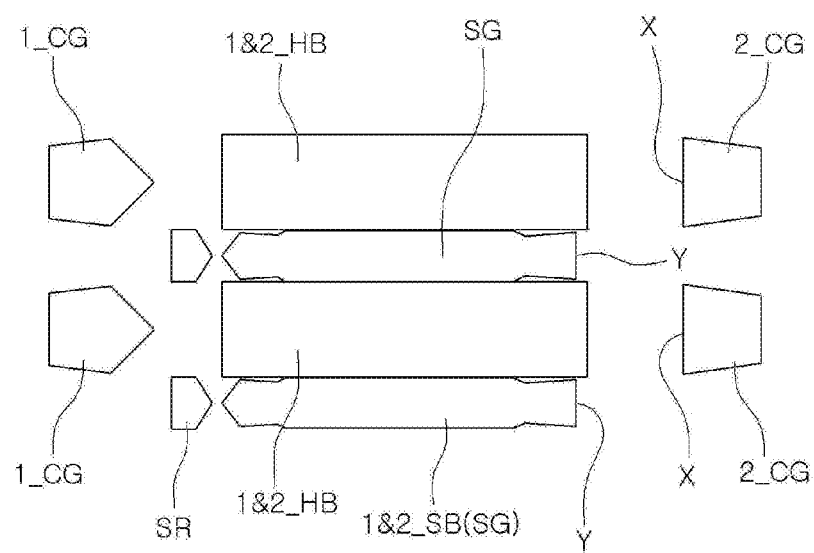
FIG. 8 is a cross-sectional view of main portions of first and second synchronizer of FIG. 1.

Furthermore, as illustrated in FIG. 8, facing surfaces of the sleeve 1&2_SB of the first and second synchronizer 1&2S and the clutch gear 2_CG of the second driven gear P2, which are enmeshed with each other, may have planar shapes that are perpendicular to the axial directions thereof.

The aspect that the facing surfaces of the sleeve 1&2_SB of the first and second synchronizer 1&2S and the clutch gear 2_CG of the second driven gear P2 has planar shapes that are perpendicular to the axial directions thereof mean that, as illustrated on the right side of FIG. 8, the clutch gear 2_CG of the second driven gear P2 and end portions of the sleeve gear SG of the sleeve 1&2_SB, which face the clutch gear 2_CG form planar shapes (X, Y) that face each other.

FIG. 8 is a cross-sectional view taken along a circumferential direction of the hub 1&2 HB around the center line, at which the hub 1&2 HB and the sleeve 1&2_SB of the first and second synchronizer 1&2S are spline-coupled to each other, and it is illustrated at the center portion of FIG. 8 that the hub 1&2 HB and the sleeve gear SG of the sleeve 1&2_SB are alternately mounted, the clutch gear 2_CG of the second driven gear P2 is illustrated on the right side of FIG. 8, and the clutch gear 1_CG of the first driven gear P1 and the synchronizer ring SR are illustrated on the left side of FIG. 8.

As described above, the synchronizer ring SR is mounted between the first driven gear P1 and the hub 1&2 HB as illustrated, the clutch gear 1_CG of the first driven gear P1 has a chamfer which is inclined axially toward the sleeve gear SG as in the conventional general synchromesh type gear-shift mechanism, and a chamfer which is mounted axially is also provided in the sleeve gear SG.

Accordingly, when a gear-shift is made by sliding the sleeve 1&2_SB from a neutral state corresponding to the center portion of the hub 1&2 HB toward the first driven gear P1, the gear-shift is made in the same manner as the conventional known technology.

Meanwhile, a process of performing a gear-shift operation of enmeshing the sleeve 1&2_SB with the second driven gear P2 is different from the conventional technology.

First, a synchronization operation is performed by coupling the servo clutch SC before the sleeve 1&2_SB contacts with the second driven gear P2. That is, because a separate synchronizer ring is not provided as in the conventional technology, synchronization is not made by a synchronizer ring but the gear ratio of the variable driving gear VD and the variable driven gear VP, as will be described below, is slightly smaller than the gear ratio of the second driving gear DG2 and the second driven gear P2, and thus a time for synchronization is generated as the servo clutch SC is coupled and a difference of relative speeds also hardly occur thereafter.

If the synchronization is made, a gear-shift is made by pushing the sleeve 1&2_SB toward the second driven gear P2, and then, the cases in which the sleeve gear SG and the clutch gear 2_CG of the second driven gear P2 meet each other correspond to two cases illustrated on the lower side of FIG. 9.

That is, the cases correspond to the left case in which the sleeve gear SG and the clutch gear 2_CG meet each other while precisely crossing each other to be immediately enmeshed with other while not being stopped by each other to complete a gear-shift operation, and the right case in which the planar shapes meet each other and collide with each other.

When the planar shapes of the sleeve gear SG and the clutch gear 2_CG meet each other and collide with each other, as illustrated, the RPM of the sleeve gear SG is slightly greater than the RPM of the clutch gear 2_CG due to a slight difference between the gear ratios as described below, and thus the sleeve gear SG and the clutch gear 2_CG are mounted while precisely crossing each other to be precisely enmeshed with each other as a predetermined time period elapses.

For reference, to simply compare the RPM of the clutch gear 2_CG and the RPM of the sleeve gear SG, FIG. 9 illustrates that a difference between relative speeds of the clutch gear 2_CG and the sleeve gear SG by indicating the RPM ω of the clutch gear 2_CG as 0 RPM and indicating the RPM ω of the sleeve gear SG as 2 RPM.

Meanwhile, the upper side of FIG. 9 illustrates three separate cases of performing a gear-shift operation in a conventional general structure in which facing surfaces of the sleeve gear SG and the clutch gear 2_CG do not have planar shapes that are perpendicular to the axial directions thereof, and each of the sleeve gear SG and the clutch gear 2_CG have a chamfer which is inclined with respect to the axial direction as in the conventional general synchromesh type gear-shift mechanism.

Case 1 corresponds to a noncontact situation, and the sleeve gear SG and the clutch gear 2_CG are mounted while precisely crossing each other when the sleeve gear SG is pressed to be enmeshed with the clutch gear 2_CG, and thus the sleeve gear SG and the clutch gear 2_CG are directly enmeshed while the chamfers of the sleeve gear SG and the clutch gear 2_CG do not collide with each other and thus the gear-shift operation is completed.

Case 2 corresponds to a forward contact situation, although the chamfer of the sleeve gear SG meets the chamfer of the clutch gear 2_CG while contacting with the chamfer of the clutch gear 2_CG, the directional component that guides the sleeve gear SG coincides with the rotation direction of the sleeve gear SG when the inclination defined as the two chamfers meet each other presses the sleeve gear SG toward the clutch gear 2_CG and the sleeve gear SG may be easily inserted into the clutch gear 2_CG, and thus the gear-shift operation is completed as time elapses without causing any problem.

However, case 3 corresponds to a reverse contact situation, and the inclination defined as the two chamfers of the sleeve gear SG and the clutch gear 2_CG meet each other is opposite to that of the case 2, and thus the directional component that guides the sleeve gear SG is opposite to the rotation direction of the sleeve gear SG when the inclination defined as the two chamfers meet each other presses the sleeve gear SG toward the clutch gear 2_CG, and thus the enmeshment cannot be smoothly made even as time elapses.

In the instant case, the sleeve gear SG and the clutch gear 2_CG may be coupled to each other by releasing the servo clutch SC to decrease a relative rotational force of the sleeve gear SG, and if such a state occurs frequently, the durability of the gear-shift deteriorates as the two chamfers of the sleeve gear SG and the clutch gear 2_CG are deformed, damaged, or worn.

In an exemplary embodiment of the present invention, to solve the above-described problems occurring when the inclined chamfers are left in the axial directions of the sleeve gear SG and the clutch gears 2_CG as described above, side-effects of generating noise, causing damage and wear while the two chamfers meet each other and collide with each other may be solved by making the shape of the facing portions of the sleeve gear SG and the clutch gear 2_CG a simple planar shape, and the sleeve gear SG and the clutch gear 2_CG may be easily enmeshed with each other even when a predetermined time period elapses although the sleeve gear SG and the clutch gear 2_CG contact each other while not being arranged to precisely cross each other such that the sleeve gear SG and the clutch gear 2_CG are enmeshed with each other by themselves properly.

For reference, when the difference between the RPMs of the clutch gear 2_CG and the sleeve gear SG is about 2 RPM in the general transmission of the vehicle as illustrated in FIG. 9, the gear-shift is completed in around 0.2 seconds even when the sleeve gear SG and the clutch gear 2_CG are not properly arranged and meet each other while contacting each other, which is not insufficient in an aspect of promptness of the gear-shift.

The gear ratio of the variable driving gear VD and the variable driven gear VP are smaller than the gear ratio of the first driving gear DG1 and the first driven gear P1 and the gear ratio of the second driving gear DG2 and the second driven gear P2.

That is, the gear ratio of the variable driving gear VD and the variable driven gear VP is slightly smaller than the gear ratio of the second driving gear DG2 and the second driven gear P2.

For example, if the gear ratio of the first driving gear DG1 and the first driven gear P1 is 3.5 and the gear ratio of the second driving gear DG2 and the second driven gear P2 is 2.8, the gear ratio of the variable driving gear VD and the variable driven gear VP is set to about 2.75.

This allows an easy and smooth operation of the sleeve 1&2_SB when the sleeve 1&2_SB of the first and second synchronizer 1&2S is to be released from a state in which they are enmeshed with the clutch gear 1_CG of the first driven gear P1 or the clutch gear 2_CG of the second driven gear P2 to a neutral state.

If the servo clutch SC is coupled such that a torque transmitted through the variable driving gear VD and the variable driven gear VP when the sleeve 1&2_SB of the first and second synchronizer 1&2S is released from the state in which they are enmeshed with the clutch gear 1_CG of the first driven gear P1 or the clutch gear 2_CG of the second driven gear P2, a time point at which the RPM of the sleeve becomes the RPM of the clutch gear 1_CG of the first driven gear P1 or the RPM of the clutch gear 2_CG of the second driven gear P2 occurs, and accordingly, a torque is not instantaneously applied to the sleeve 1&2_SB and the clutch gears 1_CG and 2_CG such that the sleeve 1&2_SB may be smoothly extracted in a neutral state.

For reference, a smooth operation of the sleeve 1&2_SB is achieved by the above-described operation by making the gear ratio of the variable driving gear VD and the variable driven gear VP smaller than the gear ratio of the first driven gear P1 of the first driving gear DG1 and the second driven gear P2 of the second driving gear DG2, whereby a smooth gear-shift operation becomes possible also in a situation in which power of the motor M is continuously applied to the motor input shaft MI.

Hereinafter, a sequential gear-shaft process of first to sixth gears will be described with reference to FIGS. 2 to 6.

Figure 2A:
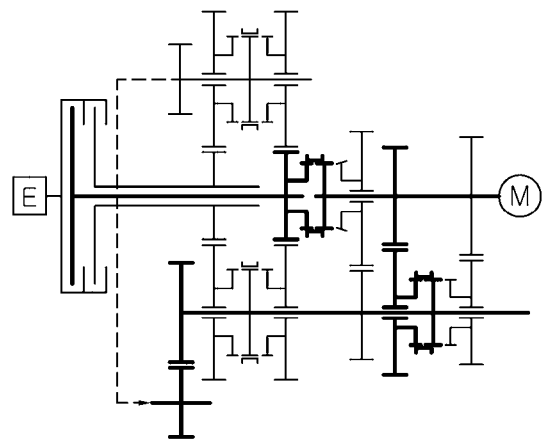
FIG. 2A, FIG. 2B, FIG. 2C, FIG. 2D, FIG. 2E and FIG. 2F are views illustrating shifting gears from a first gear to a second gear by the powertrain of FIG. 1.
Figure 2B:
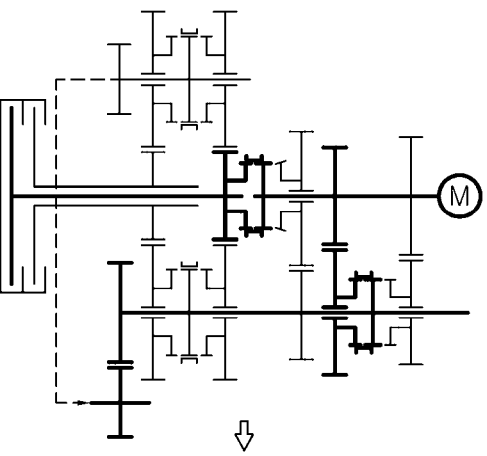
Figure 2F:
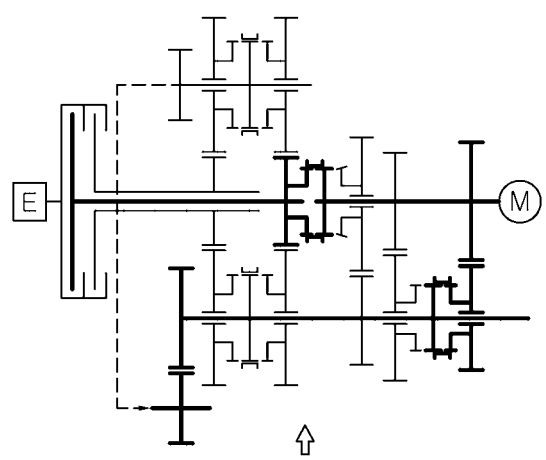
Figure 2C:
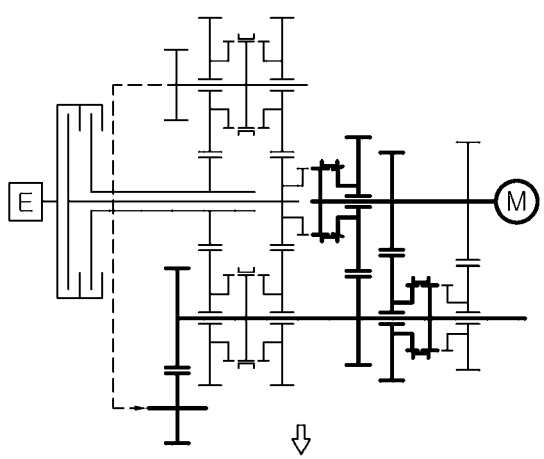

FIG. 2 illustrates a process of shifting a first gear to a second gear, FIG. 2A illustrates a state in which the power of the engine is transmitted to the motor input shaft MI through the first clutch CL1 and is shifted to first-gear power through the first driving gear DG1 and the first driven gear P1 to be extracted to the differential DF in a state in which the sleeve of the center synchronizing unit CS connects the first input shaft IN1 to the motor input shaft MI and the first and second synchronizer 1&2S connects the first driven gear P1 to the first output shaft OUT1, If a command for a gear-shift to the second gear is generated, the servo clutch SC is made to generate a frictional force by releasing the first clutch CL1 and separating the engine as in FIG. 2C and moving the center sleeve CSB of the center synchronizing unit CS toward the variable driving gear VD after the motor M is driven and the first-gear power is formed by the motor M.

Figure 2E:
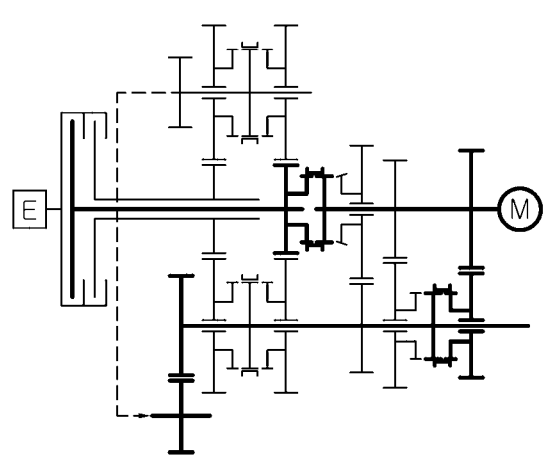
Figure 2D:
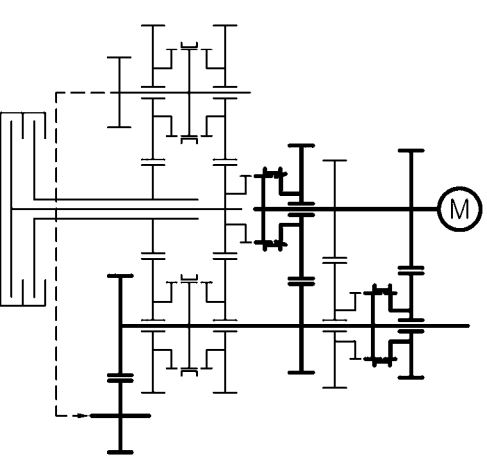

When the speed of the sleeve 1&2_SB of the first and second synchronizer 1&2_5 starts to be faster than the speed of the first driven gear P1, the sleeve 1&2_SB is released as in FIG. 2D, and the second-gear driving state by the motor M is formed by coupling the sleeve 1&2_SB to the clutch gear 2_CG of the second driven gear P2.

Accordingly, even if the sleeve gear SG of the sleeve 1&2_SB and the clutch gear 2_CG of the second driven gear P2 are not immediately enmeshed with each other as described above, they are immediately enmeshed with each other by themselves as the frictional force of the servo clutch SC further increases, and because the power from the motor M is continuously transmitted to the first output shaft OUT1 through the variable driving gear VD and the variable driven gear VP in the process, a torque interruption does not occur.

Next, if the first clutch CL1 is coupled again after the center sleeve CSB is coupled to the clutch gear 3_CG of the third driving gear DG3 and the first input shaft IN1 is connected to the motor input shaft MI as in FIG. 2E, the second-gear driving state is formed also by the power of the engine E, and the second-gear driving state only by the engine E is formed if the driving of the motor M is released as in FIG. 2F.

Figure 3A:
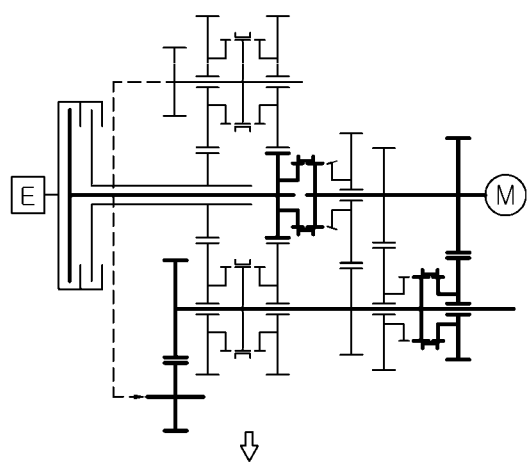
FIG. 3A, FIG. 3B, and FIG. 3C are views illustrating shifting gears from the second gear to a third gear by the powertrain of FIG. 1.
Figure 3B:
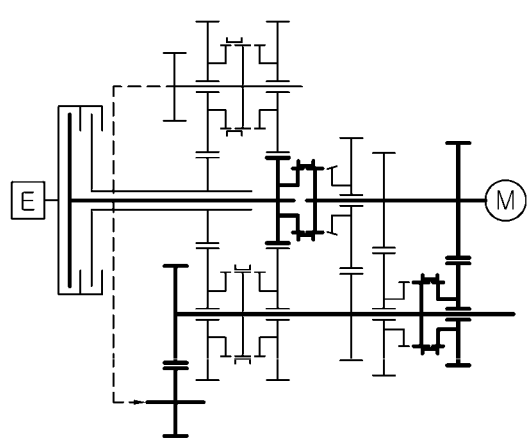
Figure 3C:
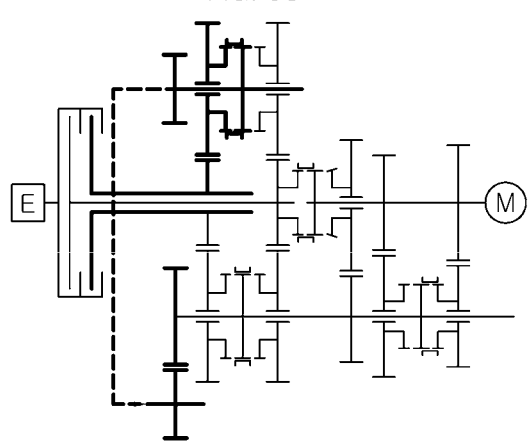

FIG. 3 illustrates a process of shifting a second gear to a third gear, and if a command for a gear-shift from the second-gear driving state to the third gear is generated in the second-gear driving state as in FIG. 3A, a gear-shift to the third-gear driving state by the engine E is completed as in FIG. 3C by releasing the first clutch CL1 while the second clutch CL2 is coupled in a state in which the third driven gear P3 is connected to the second output shaft OUT2 by the third and sixth synchronizer 3&6S as in FIG. 3B.

Figure 4A:
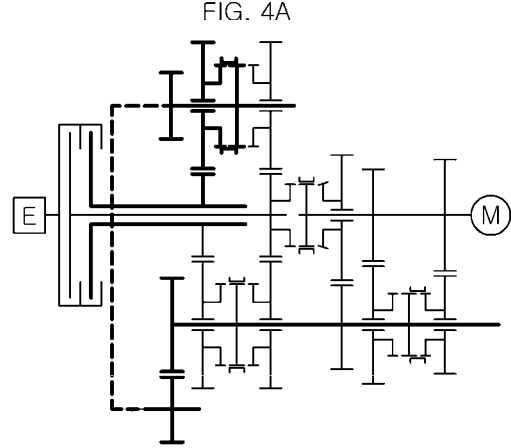
FIG. 4A, FIG. 4B, and FIG. 4C are views illustrating shifting gears from the third gear to a fourth gear by the powertrain of FIG. 1.
Figure 4B:
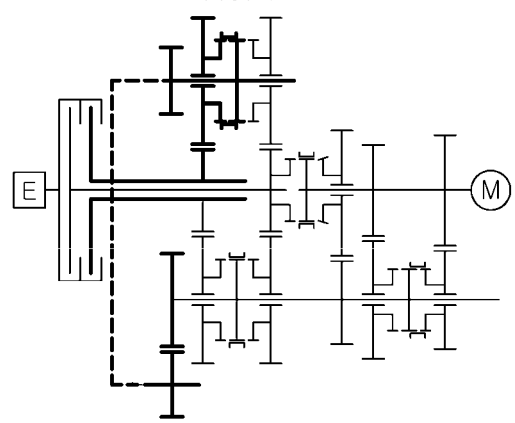
Figure 4C:
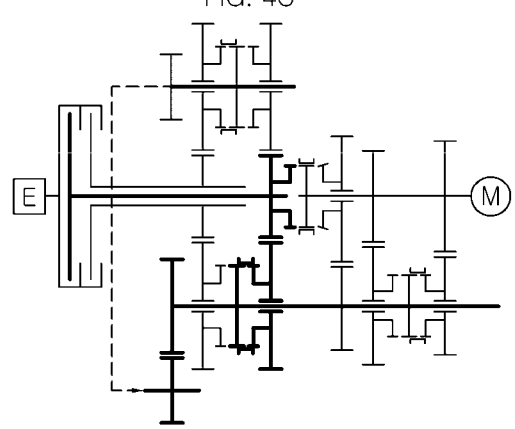

FIG. 4 illustrates a process of shifting a third gear to a fourth gear, and if a command for a gear-shift to the fourth gear is generated in the third-gear driving state as in FIG. 4A, a gear-shift to the fourth-gear driving state by the engine E is completed in as FIG. 4C by releasing the second clutch CL2 while the first clutch CL1 is coupled in a state in which the fourth driven gear P4 is connected to the first output shaft OUT1 by the fourth and fifth synchronizer 4&5S as in FIG. 4B.

Figure 5A:
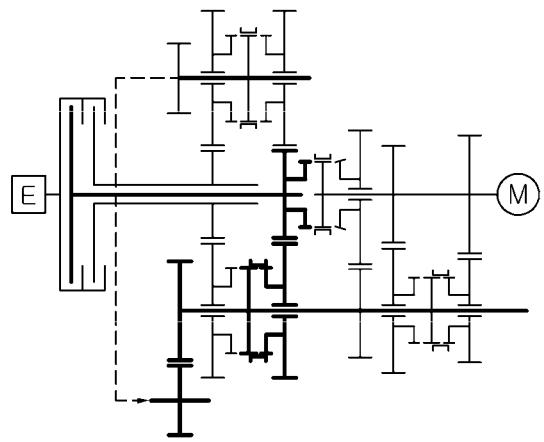
FIG. 5A, FIG. 5B, FIG. 5C, FIG. 5D, and FIG. 5E are views illustrating shifting gears from the fourth gear to a fifth gear by the powertrain of FIG. 1.
Figure 5B:
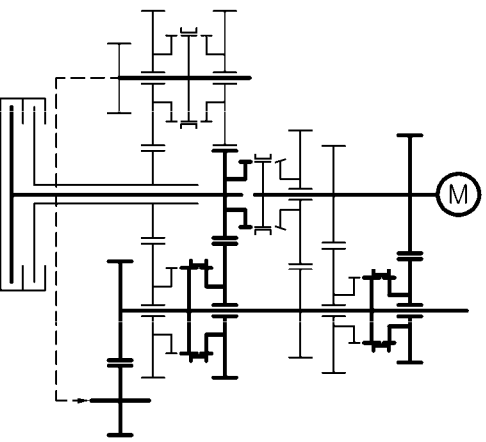

FIG. 5 illustrates a process of shifting a fourth gear to a fifth gear, and if a command for shifting a fourth-gear driving state to the fifth gear as in FIG. 5A is generated, the fourth-gear power is made to be transmitted to the first output shaft OUT1 also by the second driving gear DG2 and the second driven gear P2 by driving the motor M as in FIG. 5B.

Figure 5E:
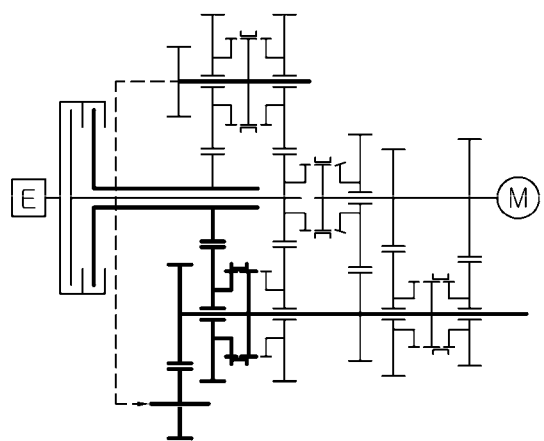
Figure 5C:
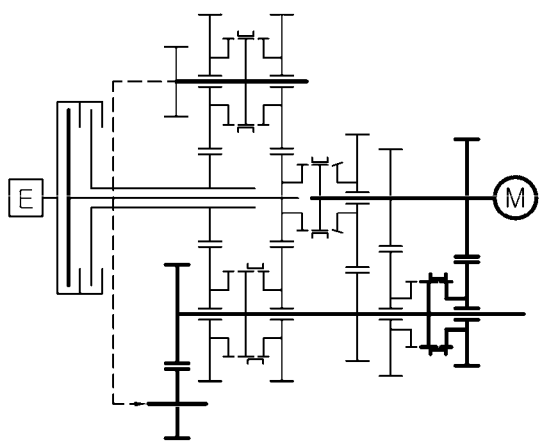

Thereafter, while the fourth-gear driving state is maintained only by the driving force of the motor M by releasing the first clutch CL1 as in FIG. 5C, the fifth driven gear P5 is connected to the first output shaft OUT1 by releasing the fourth and fifth synchronizer 4&5S from the fourth driven gear P4.

Figure 5D:
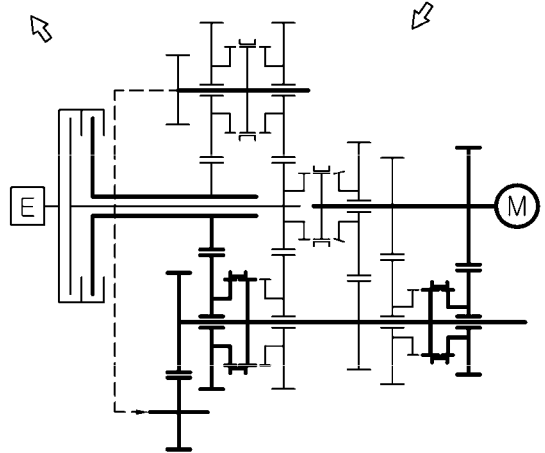

Thereafter, if the second clutch CL2 is coupled as in FIG. 5D, the fifth-gear driving state is formed by the power of the engine E, and the fifth-gear driving state is made only by the power of the engine E if the motor M is released as in FIG. 5E.

In an exemplary embodiment of the present invention, during the gear-shift from the fourth gear to the fifth gear, a torque interruption by which the power from the engine E is not transmitted to the driving wheels and is interrupted in a process of releasing a state in which the fourth and fifth synchronizer 4&5S to the fourth driven gear P4 is released and the fifth driven gear P5 is connected to the first output shaft OUT1 again via a neutral state, but a feeling of a smooth gear-shift without a torque interruption may be secured by realizing a state in which the power is continuously transmitted to the first output shaft OUT1 by the motor M.

Figure 6A:
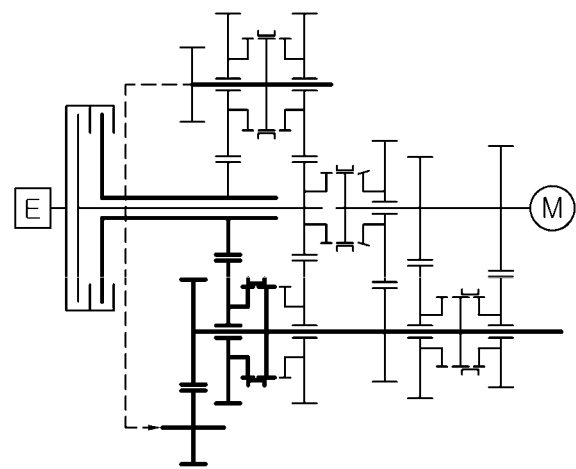
FIG. 6A, FIG. 6B, and FIG. 6C are views illustrating shifting gears from the fifth gear to a sixth gear by the powertrain of FIG. 1.
Figure 6B:
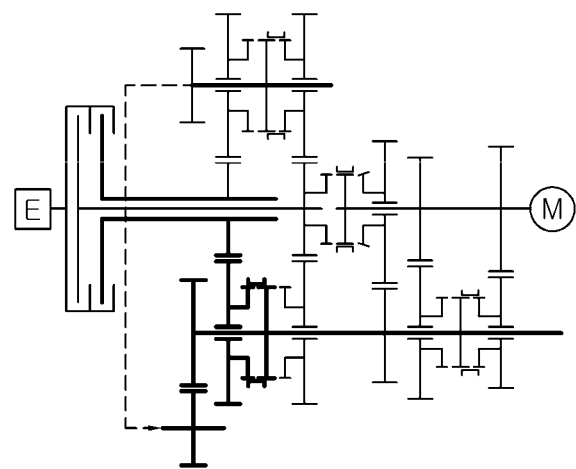
Figure 6C:
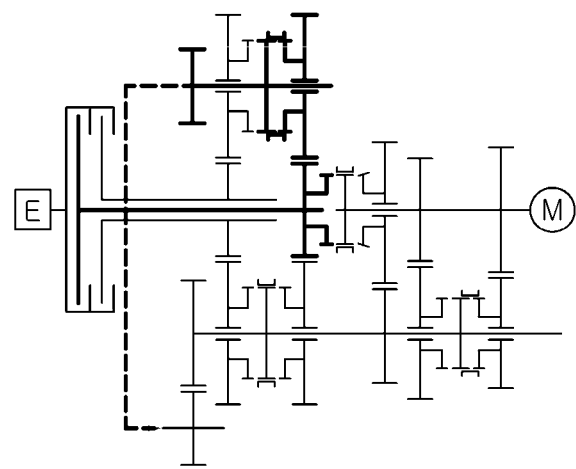

FIG. 6 illustrates a process of shifting a fifth gear to a sixth gear, and if a command for a gear-shift from the fifth-gear driving state to the sixth gear is generated in the fifth-gear driving state as in FIG. 6A, the sixth driving state as in FIG. 6C is formed by releasing the second clutch CL2 while the first clutch CL1 is coupled after the sixth driven gear P6 is connected to the second output shaft OUT2 by the third and sixth synchronizer 3&6S as in FIG. 5B.

Figure 7A:
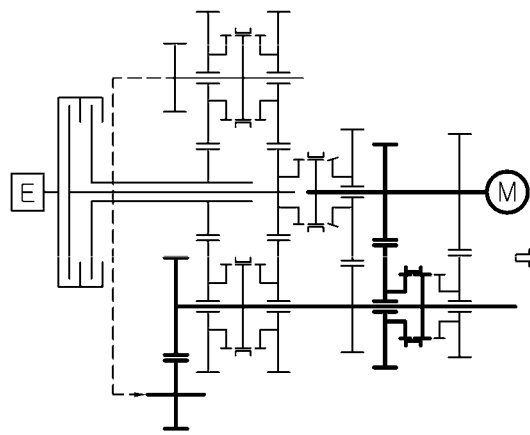
FIG. 7A, FIG. 7B, FIG. 7C and FIG. 7D are views illustrating shifting gears from a first EV gear to a second EV gear by the powertrain of FIG. 1.

Meanwhile, FIG. 7 illustrates a process of shifting a first EV gear to a second EV gear that are electric vehicle modes, and a state of FIG. 7A is a state in which the sleeve 1&2_SB of the first and second synchronizer 1&2S is enmeshed with the clutch gear 1_CG of the first driven gear P1 and the power of the motor M provided to the motor input shaft MI is extracted to the differential DF through the first driving gear DG1 and the first driven gear P1.

Figure 7B:
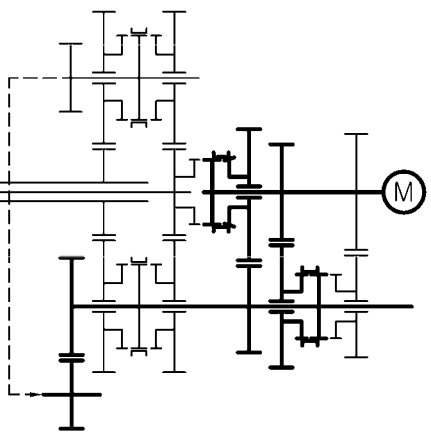

If a command for a gear-shaft to the second EV gear is generated, the power of the motor M is made to start to be transmitted to the first output shaft OUT1 also through the variable driving gear VD and the variable driven gear VP while the center sleeve CSB of the center synchronizing unit CS is attached to the variable driving gear VD as in FIG. 7B such that the servo clutch SC generates a frictional force.

Figure 7D:
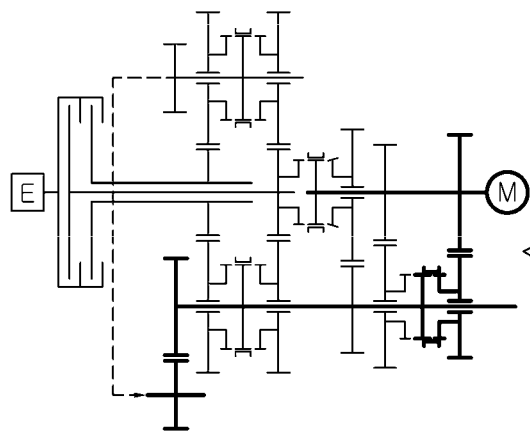
Figure 7C:
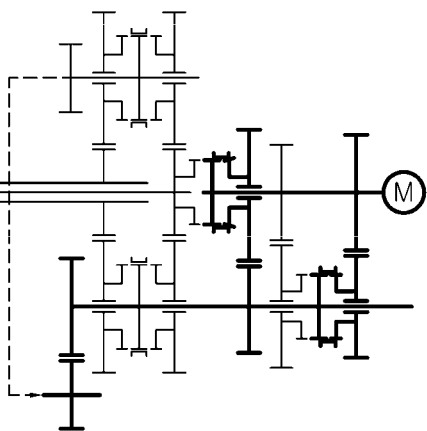

When the speed of the sleeve 1&2_SB of the first and second synchronizer 1&2S starts to be faster than the speed of the first driven gear P1, the sleeve 1&2_SB is smoothly released, and the second EV gear driving state is formed by coupling the sleeve 1&2_SB to the clutch gear 2_CG of the second driven gear P2 as in FIG. 7C.

Accordingly, even if the sleeve gear SG of the sleeve 1&2_SB and the clutch gear 2_CG of the second driven gear P2 are not immediately enmeshed with each other as described above, they are immediately enmeshed with each other by themselves as the frictional force of the servo clutch SC further increases, and because the power from the motor M is continuously transmitted to the first output shaft OUT1 through the variable driving gear VD and the variable driven gear VP in the process, a torque interruption does not occur.

Next, if the servo clutch SC is released by moving the center sleeve CSB of the center synchronizing unit CS to a neural state, the second EV gear driving state is formed while the power of the motor M is transmitted to the first output shaft OUT1 only by the second driving gear DG2 and the second driven gear P2 as in FIG. 7D.

The first EV gear and the second EV gear of FIG. 7 may be operated to the reverse gear by reversely rotating the motor M, respectively.

Meanwhile, it is apparent that the hybrid powertrain of the present invention may be realized in a hybrid mode for assisting the power of the engine E when the motor M is driven together for all of the first to sixth gears, in which the power is extracted through the first output shaft OUT1 or the second output shaft OUT2 with the power of the engine E.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:
1. A powertrain for a vehicle, the powertrain comprising:
   a first input shaft selectively connectable to an engine through a first clutch;

a second input shaft selectively connectable to the engine through a second clutch and mounted to be coaxial with the first input shaft;

a motor input shaft mounted to be coaxial with the first input shaft and to which a motor is connected;

a first output shaft and a second output shaft each mounted in parallel to the first input shaft and the second input shaft;

a center synchronizing unit mounted between the first input shaft and the motor input shaft and configured to interrupt a connection between the first input shaft and the motor input shaft;

a plurality of gears mounted between the motor input shaft and the first output shaft, between the first input shaft and the first output shaft, between the first input shaft and the second output shaft, between the second input shaft and the first output shaft, and between the second input shaft and the second output shaft, and configured to form a series of shift ratios used for driving of the vehicle; and a variable transmission mechanism configured to continuously vary power of the motor input shaft by use of the center synchronizing unit and transmit a varied power to the first output shaft, wherein the variable transmission mechanism includes:
 a variable driving gear rotatably mounted in the motor input shaft;
 a variable driven gear connected fixedly to the first output shaft to be enmeshed with the variable driving gear; and
 a servo clutch configured to continuously vary a frictional force between the motor input shaft and the variable driving gear through operation of the center synchronizing unit, wherein the servo clutch is of a conical frictional clutch, and wherein a conical surface of the servo clutch is integrally formed with the variable driving gear, wherein the center synchronizing unit includes:
 a center hub mounted in the motor input shaft; and
 a center sleeve mounted to be slid on the center hub along an axial direction of the center sleeve; and
 a synchronizer which is connected to the first input shaft through synchronization by a synchronizer ring as the center sleeve moves to a first direction, and wherein the center sleeve is configured to press the conical surface of the variable driving gear as the center sleeve moves to a second direction.

2. The powertrain of claim 1, wherein the plurality of gears includes a first group of gears, a second group of gears, a third group of gears, a fourth group of gears, and a fifth group of gears, wherein the first group of gears between the motor input shaft and the first output shaft are for a first gear shifting ratio and for a second gear shifting ratio, respectively, wherein the second group of gears between the first input shaft and the first output shaft is for a fourth gear shifting ratio, wherein the third group of gears between the first input shaft and the second output shaft is for a sixth gear shifting ratio, wherein the fourth group of gears between the second input shaft and the first output shaft is for a fifth gear shifting ratio, and wherein the fifth group of gears between the second input shaft and the second output shaft is for a third gear shifting ratio.

3. The powertrain of claim 1,
wherein the first clutch and the second clutch correspond to a dual clutch formed in one clutch housing, and
wherein the second input shaft is a hollow shaft that surrounds the first input shaft.

4. The powertrain of claim 2,
wherein the first group of gears includes a first driving gear and a second driving gear and the first driving gear for the first gear shifting ratio and the second driving gear for the second gear shifting ratio are mounted in the motor input shaft,
wherein a first driven gear enmeshed with the first driving gear and a second driven gear enmeshed with the second driving gear are mounted in the first output shaft,
wherein the second group of gears and the third group of gears include a third driving gear mounted in the first input shaft and commonly used for the fourth gear shifting ratio and the sixth gear shifting ratio,
wherein the fourth group of gears and the fifth group of gears include a fourth driving gear mounted in the second input shaft and commonly used for the third gear shifting ratio and the fifth gear shifting ratio,
wherein a fourth driven gear enmeshed with the third driving gear and a fifth driven gear enmeshed with the fourth driving gear are mounted in the first output shaft, and
wherein a sixth driven gear enmeshed with the third driving gear and a third driven gear enmeshed with the fourth driving gear are mounted in the second output shaft.

5. The powertrain of claim 4, wherein a gear ratio of the variable driving gear and the variable driven gear are lower than a gear ratio of the first driving gear and the first driven gear and a gear ratio of the second driving gear and the second driven gear.

6. The powertrain of claim 4, wherein a clutch gear enmeshed with the center sleeve of the center synchronizing unit is integrally formed with the third driving gear.

7. The powertrain of claim 4,
wherein the first driving gear and the second driving gear are fixedly mounted in the motor input shaft so that rotation of the first driving gear and the second driving gear is constrained by the motor input shaft,
wherein the third driving gear is fixedly mounted in the first input shaft so that rotation of the third driving gear is constrained by the first input shaft,
wherein the fourth driving gear is fixedly mounted in the second input shaft so that rotation of the fourth driving gear is constrained by the second input shaft,
wherein a first and second synchronizer configured to selectively constrain rotations of the first driven gear and the second driven gear and a fourth and fifth synchronizer configured to selectively constrain rotations of the fourth driven gear and the fifth driven gear are mounted in the first output shaft, and
wherein a third and sixth synchronizer configured to selectively constrain rotations of the third driven gear and the sixth driven gear is mounted in the second output shaft.

8. The powertrain of claim 7,
wherein a synchronizer configured to perform synchronization by use of the synchronizer ring is mounted between the first and second synchronizer and the first driven gear, and
wherein a dog clutch in which a sleeve of the first and second synchronizer is directly enmeshed with a clutch gear of the second driven gear is mounted between the first and second synchronizer and the second driven gear.

9. The powertrain of claim 7, wherein the first and second synchronizer includes:
a first clutch gear connected to the first driven gear;
a second clutch gear connected to the second driven gear;
a hub fixed to the first output shaft; and
a sleeve slidably engaged to the hub and configured to selectively constrain rotations of the first driven gear and the second driven gear according to a movement of the sleeve of the first and second synchronizer.

10. The powertrain of claim 7, wherein the fourth and fifth synchronizer includes:
a first clutch gear connected to the fourth driven gear;
a second clutch gear connected to the fifth driven gear;
a hub fixed to the first output shaft; and
a sleeve slidably engaged to the hub and configured to selectively constrain rotations of the fourth driven gear and the fifth driven gear according to a movement of the sleeve of the fourth and fifth synchronizer.

11. The powertrain of claim 7, wherein the third and sixth synchronizer includes:
a first clutch gear connected to the third driven gear;
a second clutch gear connected to the sixth driven gear;
a hub fixed to the second output shaft; and
a sleeve slidably engaged to the hub and configured to selectively constrain rotations of the third driven gear and the sixth driven gear according to a movement of the sleeve of the third and sixth synchronizer.

12. The powertrain of claim 8,
wherein facing surfaces of the sleeve of the first and second synchronizer and the clutch gear of the second driven gear, which are enmeshed with each other, have planar shapes that are perpendicular to an axial directions thereof.

13. The powertrain of claim 12, wherein the clutch gear of the second driven gear and end portions of a sleeve gear of the sleeve of the first and second synchronizer, which face the clutch gear of the second driven gear form the planar shapes that face each other.

* * * * *